United States Patent [19]

Olson et al.

[11] 3,741,022

[45] June 26, 1973

[54] PROBING DEVICE FOR MICROCIRCUITS

[76] Inventors: Jack Edward Olson, 1633 South Yukon St., Lakewood; Guy G. Catalano, 3910 South Kalamath, Englewood, both of Colo.

[22] Filed: Nov. 23, 1970

[21] Appl. No.: 91,652

[52] U.S. Cl.............. 74/102, 324/158 F, 324/158 P
[51] Int. Cl............................................ F16h 21/44
[58] Field of Search....................... 74/25, 99, 102; 33/1 M; 339/75 R; 324/158 F, 158 P

[56] References Cited
UNITED STATES PATENTS

| 3,006,245 | 10/1961 | Bycer et al. | 33/1 M X |
| 3,551,807 | 12/1970 | Kubschenko et al. | 324/158 P |
| 3,437,929 | 4/1969 | Glenn | 324/158 P |

*Primary Examiner*—William H. Schultz
*Attorney*—Richard D. Law

[57] ABSTRACT

A table supporting a three dimensional movement probe mounted on roller bearings for two dimensional horizontal movement, is contained in a spring loaded C-clamp frame which includes means for vertical movement.

14 Claims, 7 Drawing Figures

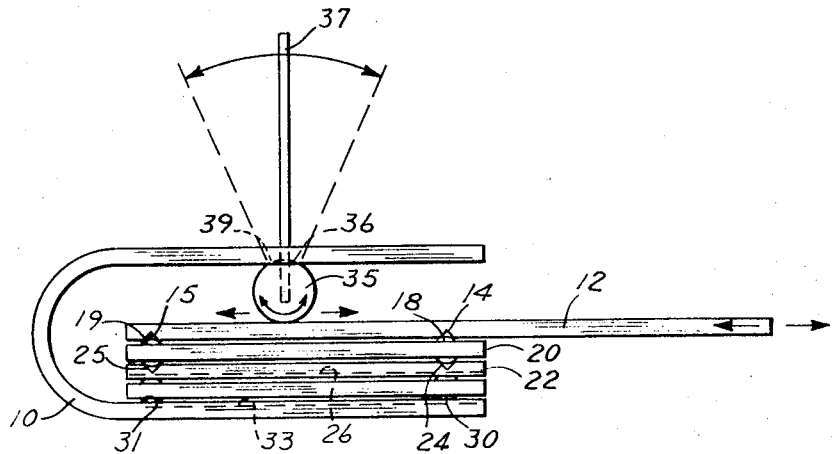
FIG. 1
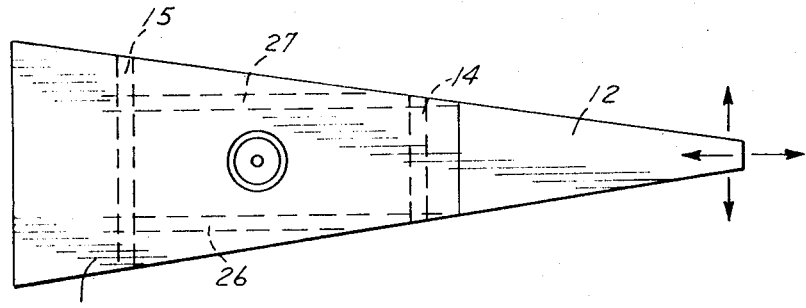
FIG. 2
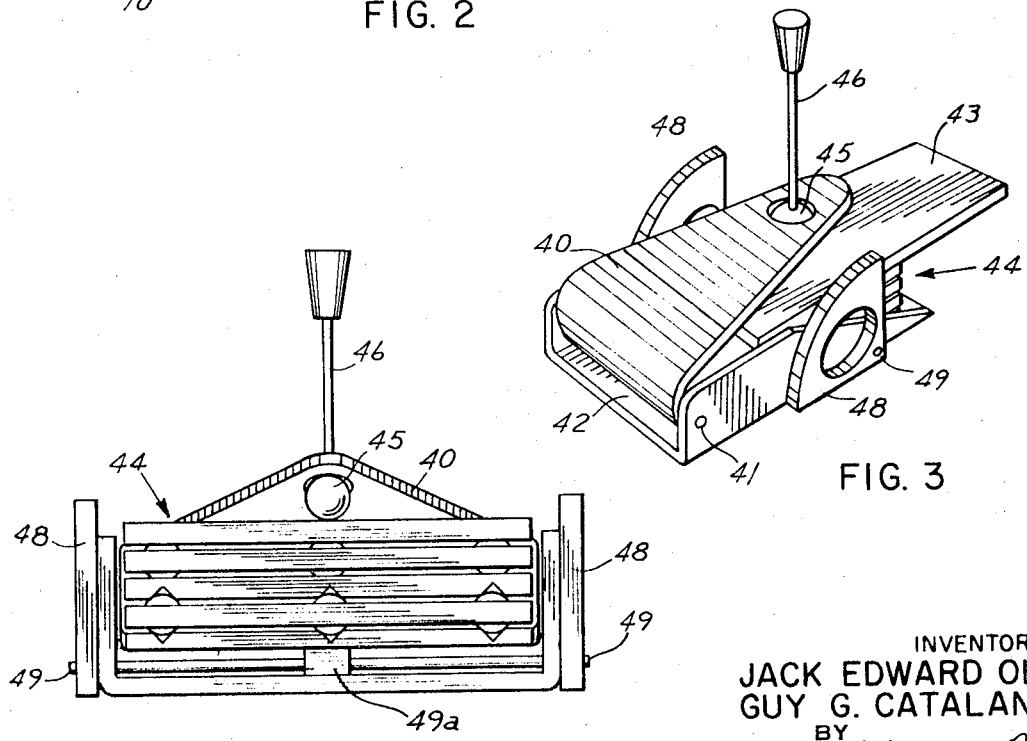
FIG. 3
FIG. 4
INVENTORS
JACK EDWARD OLSON
GUY G. CATALANO
BY
Richard D. Law
ATTORNEY INVENTORS
JACK EDWARD OLSON
GUY G. CATALANO
BY
Richard D. Law
ATTORNEY

PROBING DEVICE FOR MICROCIRCUITS

Electronic circuits having relatively large components such as vacuum tubes, etc., are easily checked at various circuit junctions by hand held probes connected to conventional instruments as an oscilloscope. Of course, such probes may be used in conjunction with other electrical test apparatus such as ammeters, ohmmeters, and inductance measuring devices, etc. However, when the circuit is reduced to microminiaturize size, a hand-held probe is no longer feasable. It is extremely difficult to hand-hold a finely pointed needle at a delicate circuit junction; not only may inaccurate readings result, but a slip or exertion of too much pressure could damage an expensive chip circuit. And, in many cases the part to be tested is not visible to the unaided eye and very small movements of the probe are necessary.

In the prior art devices are known whereby a thin needle probe extending from a supporting structure may be remotely controlled. The typical probe is a complex arrangement of delicate springs, levers, hinges and pivots. Such arrangements usually exhibit backlash, i.e., movement of the controls does not produce exact predictable movement of the probe, so that precision is lost. Such devices must be very carefully handled at all times as a severe jolting may cause the probing instrument to lose its sensitivity. Further, delicate parts may quickly malfunction due to mechanical wear, or spring tensions may change with use, and the device thereby requires frequent maintenance or adjustment. In many instances, particularly with modular wafers, many such probes need to be positioned at various points about a miniature electronic circuit in order to make the necessary measurements. Size is, thus, an important criteria.

In general, the device of the invention provides mounting and positioning structure for probes to test the electronic components of miniature or microminiature circuits. The device provides controlled needle positioning in three dimensions, i.e., in the X, Y and Z directions of a rectangular coordinate system. The moving parts generally comprise plates sliding parallel to one another on wear-resistant race-fitted bearings. Movement of a joy stick control accurately positions the needle probe with negligable backlash.

An important object of the present invention is to provide a ruggedly constructed precision probe device.

A further object is to provide a probe device wherein manual control movement produces exact, predictable probe movement.

Still another object of the invention is to provide a probe device wherein wear and adjustments are minimized.

Yet another object of the invention is to provide a probe device conveniently used with miniature circuits.

A still further object of the invention is to provide a device whereby a depending probe may be positioned in three dimensions, along X, Y and Z axes.

An additional object of the invention is to provide a probe device wherein the probe needle is easily replaced.

Another additional object of the present invention is to provide a probe device having such configuration that a large number of such devices may be positioned circumferentially around a small circuit.

These and other objects and advantages of the present invention may be readily ascertained from the following description and appended illustrations in which:

FIG. 1 is a side elevational view of one form of a probe support according to the invention;

FIG. 2 is a top plan view of the device of FIG. 1;

FIG. 3 is a perspective view of another modified form of probe support according to the invention;

FIG. 4 is an end elevational view of the device of FIG. 3;

Figure 5:
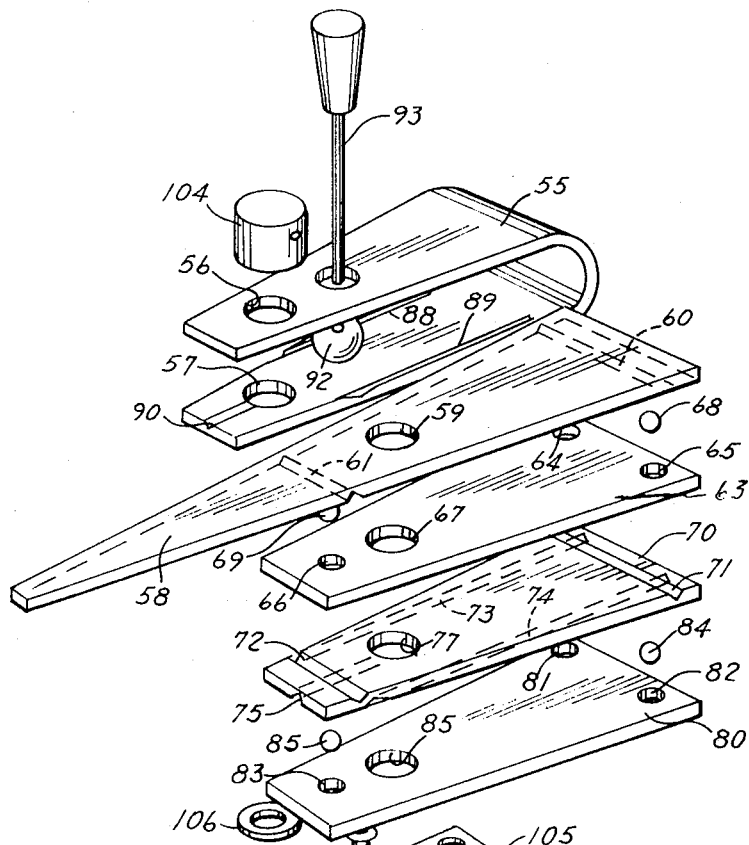
FIG. 5 is an exploded view of the components of a further modified probe support according to the invention.

In the device illustrated in FIGS. 1 and 2 a spring loaded C-clamp or C-frame 10 secures a probe support or X, Y, Z table 12 on a ball bearing stack. The table has lateral grooves 14 and 15 extending across its width in the vicinity of C-frame 10. Ball bearings 18 and 19 are arranged to ride in the grooves 14 and 15 to permit the table 12 to move laterally of the C-frame. Generally four spaced balls are used for uniform support of table 12. A bearing positioning plate 20 secures the four balls in position under the table 12. A middle ball support plate 22 includes lateral grooves 24 and 25, on its upper surface, which extends in the same direction as the grooves 14 and 15 in the table 12. This permits the upper balls to support the table for movement laterally of the C-frame 10. On the lower side of the plate 22 two longitudinal grooves 26 and 27 (at 90° to the grooves on the upper side) accommodating balls 30 and 31 to permit the upper stack members and table 12 to move longitudinally of the C-frame, and the balls ride in grooves 33 and 34 in the bottom part of the C-frame 10. In this case three, four or five balls may be used in the registered grooves of plate 22 and the bottom of the C-frame. The movable stack is secured in position by the spring action of the C-frame 10 bearing against a ball bearing 35, resting on the top of plate 12 in a tight friction engagement. The ball 35 is secured in a recess 36 in the upper leg of C-frame 10. A joy stick control lever 37 extends through an opening 39 in the top of the C-frame and is secured to the ball 35 to cause rotation of the ball 35 and thereby movement of the table 12. The stick may be moved 360° for complete circular movement of the table end.

The table 12 is moved in horizontal plane by movement of the joy stick 37 with the ball bearings mounted in the various grooves, permitting free movement of the table along X and Y axes which lie in the same plane. The spring action of the C-frame 10 maintains the components in tight engagement, but the balls mounted in the grooves permit movement of the table, on rotation of the ball 35, without any extraneous movement or backlash. For a unit having an overall length of about 4 ½ inches, and with a joy stick upper tip travel of about 1 ⅝ inches a motion reduction of 9 to 1 is acquired permitting a probe movement within about three-tenths of an inch diameter circle. The height of the probe above a base plane may be easily adjusted by means of wedges, cams or the like placed under the forward edge of the C-frame 10. A probe may be mounted on the small extended end of the table 12 in any convenient manner or as may be desired. One form of probe mounting is shown in FIG. 7, described below.

In a modified form of the probe support of the invention shown in FIGS. 3 and 4, a spring C-frame 40 is pivotally mounted by a pivot pin 41 in a U-shaped frame 42. The pivot pin may be a pin extending from one leg to the other leg of the U-shaped support frame or may be a pin secured to the C-frame 40 as may be desired or the pivotal connection may be a pin secured to each side of the U-frame providing a point bearing in sockets in the C-frame, or other desired configuration. A three dimensional probe support table 43 is mounted on a ball and plate stack, shown in general by numeral 44, similar to the stack illustrated in FIG. 1, including the grooves in the various plates for permitting lateral movement of the table 43 in the C-frame 40. A ball 45 frictionally bearing on the table 43 causes movement of the table 43 on movement of the joy stick 46, as explained for the device of FIG. 1 above. Vertical movement of the table 43 in the U-frame 42 is provided by means of a pair of eccentrics 48 mounted on each side thereof by pivot pin 49 extending through the U-frame. A cam 49a secured to the pin 49 below the C-frame 40 is rotated by rotation of eccentrics 48 against the bottom of the C-frame to provide vertical movement of the C-frame 40 around its pivot pin 41 in the U-frame 42. This provides for three dimensional movement of the probe support table 43.

Figure 6:
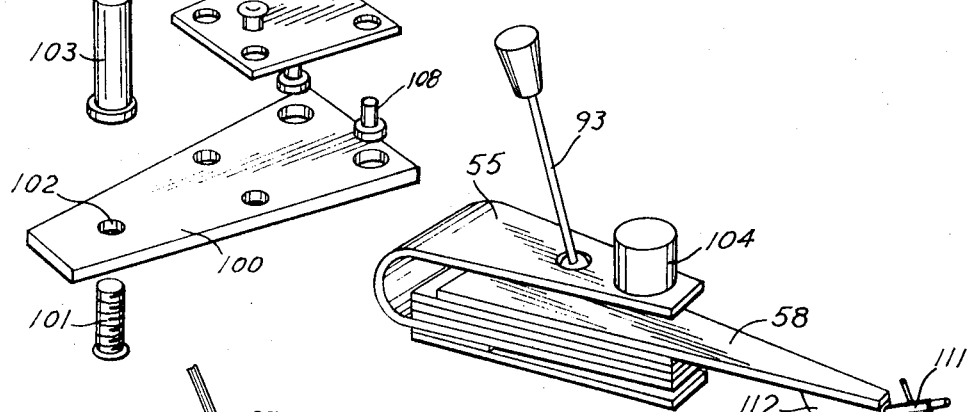
FIG. 6 is a perspective view of the probe support of FIG. 5 in assembled condition including a mounted probe thereon.
Figure 7:
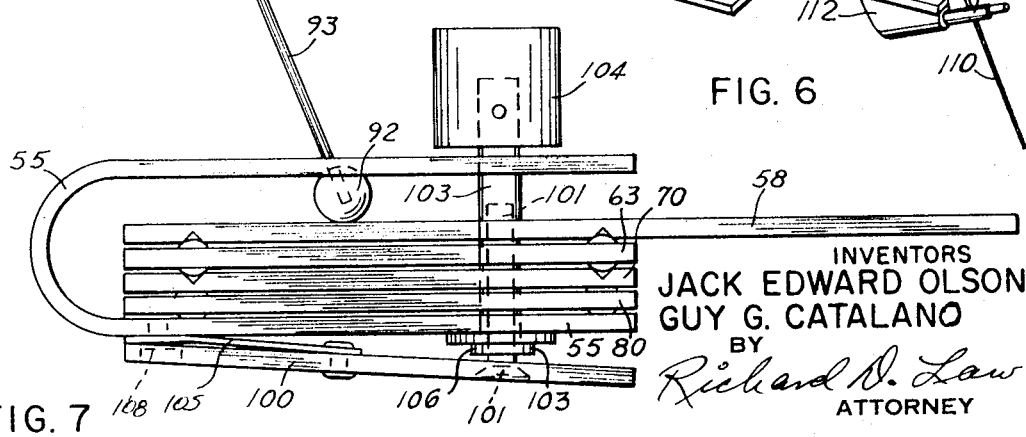
FIG. 7 is a side elevational view of the device of FIG. 6, in larger detail, showing the positioning of the components thereof.

In the device illustrated in FIGS. 5, 6 and 7, a C-frame 55 is pivotally secured to a base to provide a vertical adjustment for the probe support table. The C-frame 55 arranged to provide spring tension on contained units includes a pair of aligned holes 56 and 57 adjacent the ends of the legs thereof. A probe support or X, Y, Z table 58 is provided with a hole 59 which is arranged to align with the holes in the C-frame. On the bottom of the table 58 are provided lateral grooves 60 and 61 providing lateral ball races for the table. A bearing retaining plate 63 is provided with ball retaining holes 64, 65 and 66 for retaining ball bearings that ride in the ball races 60 and 61, for example, balls 68 and 69. The races 60 and 61 provide for movement of the table in the Y axis. Plate 70 provided with grooves 71 and 72 thereon align with grooves 60 and 61 and provide the Y axis motion. Grooves 73, 74 and 75 on the bottom thereof align with grooves 88, 89, and 90 on the bottom leg of the C-frame providing movement of stack in the X axis. Plate 63 is provided with a hole 67 arranged to mate with the holes in the C-frame and the table, and the plate 70 is provided with a hole 77 for mating with these holes. Retainer plate 80 is provided with ball retaining holes 81, 82 and 83 for retaining balls such as balls 84 and 85 which are arranged to ride in the ball races 73, 74 and 75 and mating races 88, 89 and 90. A hole 85 in the middle of plate 80 is arranged to mate with the other holes in the C-frame and plates. The longitudinal grooves 88, 89 and 90 in the top of the bottom leg of the C-frame provide the ball races for the X axis under the retainer plate 80, with the balls 84 and 85 riding in the ball race grooves in the C-frame. A retaining ball 92 attached to handle 93 secures the assembly in the C-frame in the manner described for in FIG. 1. A base plate 100 is secured at one end by means of a rivets 108 to the bottom of the C-frame. A threaded stud 101 extending through an opening 102 engages a female screw 103 extending through the openings in the stack and C-frame, to which is attached a control knob 104. A hinge and spring plate 105 is, also, secured by rivets to the bottom of the C-frame to provide movement along the Z axis on rotation of the control knob 104 which moves the female screw in relation to the threaded stud and thereby provides movement of the C-frame in relation to the base frame 100.

With the arrangement of FIGS. 5, 6 and 7 the base plate sits on a supporting surface with a probe mounted adjacent a wafer circuit, and by rotating the control knob 104 and moving the joy stick control 93, the probe may be moved in any position desired.

A probe 110 is secured in a holder 111 which in turn is mounted in a base 112 attached to the end of the X, Y, Z table 58. A wire or electrical lead may then be attached to the probe 111 and passed back along the unit for connection to an instrument. By making the base 112 of non-conductive material the probe is isolated from the support table to prevent conductance of the current of the circuit to the support mechanism.

Various types of base mechanisms may be used to support the C-frame. A useful base is one having a magnet incorporated in it for adhering to a paramagnetic support surface. This provides quick placement of the probe support and insures relatively immobility during use.

We claim:

1. A multidirectional movement probe support comprising:
   a. a C-frame of resilient material providing spring action between its legs;
   b. probe support table means positioned between said legs of said C-frame and extending therefrom;
   c. laterally and longitudinal movable means adjacent said table means positioned between said legs of said C-frame;
   d. friction drive means bearing on said table means and one leg of said C-frame whereby said table means and said movable means are retained together by spring biased action of said legs of said C-frame;
   e. means extending through said one leg of said C-frame for moving said friction drive means bearing on said table means and thereby moving said table means; and
   f. means for moving one end of said C-frame vertically and thereby moving said table means in a vertical path.

2. A multidirectional movement probe support according to claim 1 wherein said laterally and longitudinal movable means includes a series of ball bearings and bearing retainers means for free lateral and longitudinal movement of said probe support table.

3. A multidirectional movement probe support according to claim 2 wherein said series of ball bearings are formed in two sets, and one set is arranged in lateral bearing race grooves and the other set is arranged in longitudinal grooves in said bearing retainer means.

4. A multidirectional movement probe support according to claim 1 wherein said friction drive means bearing on said table means is an enlarged ball bearing frictionally engaging said probe support table.

5. A multidirectional movement probe support according to claim 4 wherein said enlarged ball bearing is mounted in a mating recess in said one leg of said C-frame.

6. A multidirectional movement probe support according to claim 4 wherein said means extending through said one leg of said C-frame is a joy stick secured to said enlarged ball bearing providing complete circular movement in a plane of any point on said table means.

7. A multidirectional movement probe support according to claim 6 wherein said joy stick movement is transmitted to said table means at a fixed ratio of movement reduction.

8. A multidirectional movement probe support according to claim 7 wherein said fixed ratio of movement reduction is in a range of 5:1 to 20:1.

9. A multidirectional movement probe support according to claim 1 wherein said means for moving said C-frame in a vertical path includes base means pivotally secured to said C-frame, and means to provide vertical pivotal movement of said C-frame in said base means.

10. A multidirectional movement probe support according to claim 9 wherein said means to provide pivotal movement includes extendable screw means extended through said C-frame legs said table means and said laterally and longitudinally movable means and spaced from the pivotal connection between said C-frame and base means for providing angular displacement of said C-frame in relation to said base means.

11. A multidirectional movement probe support according to claim 9 wherein said base is hingedly mounted from one end to said C-frame, and spring means therebetween biases said members toward open position.

12. A multidirectional movement probe support comprising:
a. C-frame means;
b. a stack of at least two movable planar elements, one of which includes means for supporting a probe mounted in said C-frame means;
c. a set of ball bearings mounted between and spacing said at least two movable planar elements apart;
d. guide means for said ball bearings associated with said at least two movable planar elements permitting relative movement of said elements in a single direction on said ball bearings;
e. ball bearing means on either side of said two movable planar elements bearing against said C-frame means and thereby securing said elements and C-frame means in an assembly; and
f. guide means associated with said C-frame means and said either side of said movable planar elements permitting movement of said two planar elements in a direction 90° to the movement between said two planar elements.

13. A multidirectional movement probe support having at least a pair of planar elements movable relative to each other in one direction and both movable conjointly in a direction which is 90° to said one direction, and frame means securing said elements in an assembly, the improvement of ball means mounted between said pair of planar elements and said frame means frictionally engaging one said planar element and movable thereon, a depression in said frame means and said ball means rotatably mounted in said depression and retained in one position on said frame, whereby rotative movement of said ball means moves said planar elements.

14. A multidirectional movement probe support according to claim 13 wherein a joy stick is attached to said ball means providing means for rotation of said ball means and thereby movement of said pair of planar elements in 360° in a plane.

* * * * *